April 12, 1932.    D. K. BLAKE    1,853,954
SYSTEM OF ELECTRIC DISTRIBUTION
Filed Sept. 10, 1929
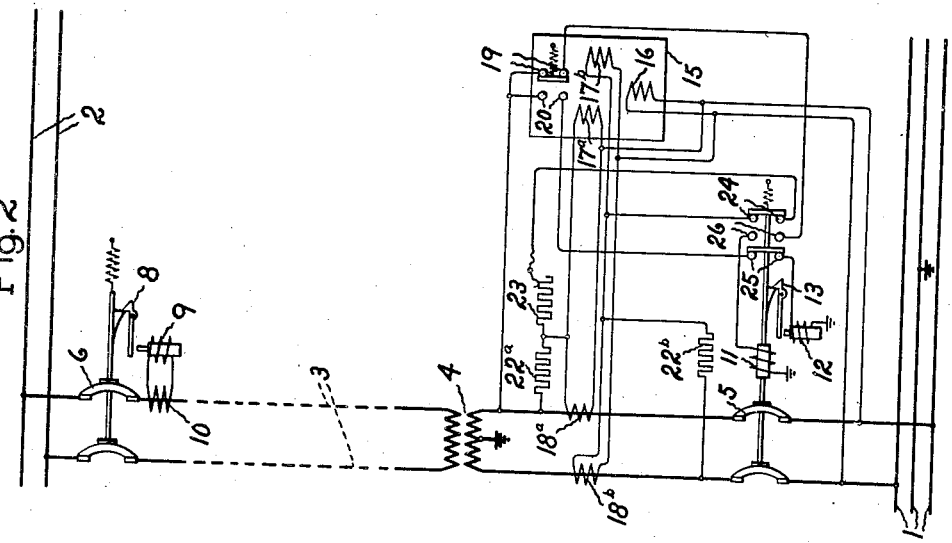
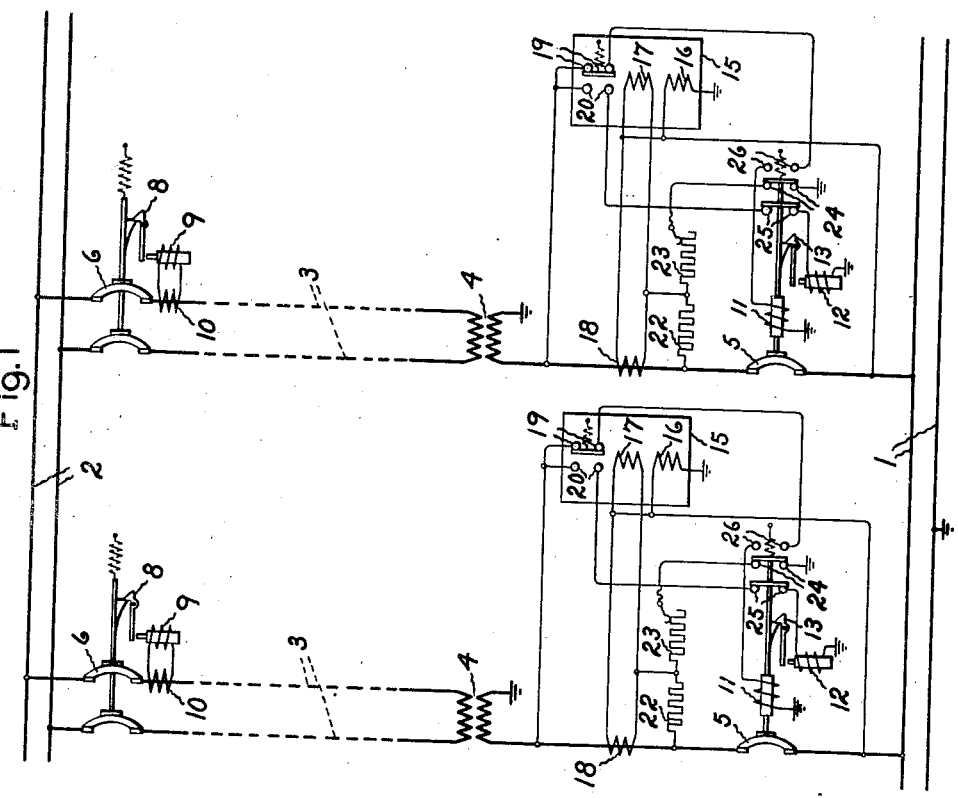
Inventor:
David K. Blake,
by Charles V. Tulla
His Attorney.

Patented Apr. 12, 1932

1,853,954

UNITED STATES PATENT OFFICE

DAVID K. BLAKE, OF SCOTIA, NEW YORK, ASSIGNOR TO GENERAL ELECTRIC COMPANY, A CORPORATION OF NEW YORK

SYSTEM OF ELECTRIC DISTRIBUTION

Application filed September 10, 1929. Serial No. 391,676.

My invention relates to systems of electric distribution and particularly to alternating current networks which are supplied with current at a plurality of points by means of feeder circuits fed from the same or different source of current. In such network systems it is desirable to be able to disconnect a feeder from the network whenever a fault occurs on the feeder or the feeder is disconnected from its source of current and to reconnect the feeder to the network automatically when the feeder is reenergized.

One object of my invention is to provide an improved arrangement for controlling the disconnection of a feeder from a network in response to a reversal of energy flow occurring through the feeder whereby the value of reverse energy in the feeder necessary to effect the disconnection of the feeder may be readily varied.

For the purpose of explaining the present invention it has been illustrated in the accompanying drawings as applied to an alternating current distribution system with an interconnected secondary system but it will be understood that it may be applied to other systems of electric distribution and in general to two interconnected alternating current circuits which are subject to a reversal of energy flow between them.

My invention will be better understood from the following description taken in connection with the accompanying drawings and its scope will be pointed out in the appended claims.

In the drawings Fig. 1 diagrammatically shows an alternating current distribution system embodying my invention and Fig. 2 is a modification of the control arrangement shown in Fig. 1.

Referring to Fig. 1, 1 is a single-phase network which is arranged to be supplied with electric energy from a suitable supply circuit 2 by means of a plurality of feeder circuits 3, two of which are shown in the drawings.

Each feeder circuit 3 includes a step-down transformer 4, the low voltage secondary winding of which is arranged to be connected to the network by means of a suitable circuit breaker 5 and the primary winding of which is arranged to be connected to the supply circuit 2 by means of a suitable circuit breaker 6. The transformers 4 and the secondary circuit breakers 5 are usually located near the network 1 whereas the primary circuit breakers 6 are usually in the main station or substation containing the supply circuit 2.

The circuit breakers 6, which may be of any suitable type, examples of which are well known in the art, are preferably arranged so that they are opened in response to overload conditions on the respective feeder circuits. As shown, each circuit breaker 6 is an overload circuit breaker of the well known latched-in type and is adapted to be opened by releasing a latch 8 either manually or automatically by means of an overload relay 9 which is connected in series relation with the respective feeder circuit 3 by means of a current transformer 10. Any suitable means, either manually or automatically controlled, may be provided for closing the circuit breakers 6.

The circuit breakers 5 may also be of any suitable type, examples of which are well known in the art. As shown in the drawings, each circuit breaker 5 is of the well known latched-in type and includes a closing coil 11 which, when energized, closes the circuit breaker and a trip coil 12 which when energized releases a latch 13 which holds the circuit breaker in its closed position.

In order to effect the opening of a secondary circuit breaker 5 when a fault occurs in the associated transformer 4 or feeder circuit 3 or when the associated primary circuit breaker 6 is opened, each secondary circuit breaker 5 has associated therewith a power directional relay 15 which is arranged to effect the energization of the trip coil 12 of the circuit breaker when a predetermined small amount of reverse power flows from the network to the associated feeder circuit. The power directional relays 15 may be of any suitable type examples of which are well known in the art. As shown, each power directional relay 15 includes a potential winding 16 which is permanently connected across the network 1 and a current coil 17 which is permanently connected across the secondary winding of a current transformer 18 the primary winding of which is connected in series relation with the secondary winding of the associated power transformer 4 and the network 1 when the associated circuit breaker 5 is closed. Each power directional relay 15 is arranged so that normally it maintains closed its contacts 19 which are in an energizing circuit for the closing coil 11 of the associated circuit breaker 5. When, however, more than a predetermined small amount of reverse power flows from the network 1 to a feeder circuit 3, the associated power directional relay 15 is arranged to open its contacts 19 and closes its contacts 20 which are in an energizing circuit for the trip coil 12 of the associated circuit breaker 5.

In order that each power directional relay 15 may also control the reclosing of the associated secondary circuit breaker 6 the current winding 17 of each power directional relay is also connected directly in a shunt circuit around the terminals of the associated secondary circuit breaker 5 so that when the secondary circuit breaker is open a voltage which depends upon the relative phases and magnitudes of the associated power transformer secondary and the network voltages is impressed across the current winding 17. Preferably, a suitable current limiting device, such as a resistor 22 which has a negative temperature coefficient, is connected in series with each winding 17 in the shunt circuit around the terminals of the associated secondary circuit breaker 6.

The arrangement heretofore described for controlling the opening and closing of a secondary circuit breaker is an arrangement old and well known in the art for controlling the network circuit breakers.

In order that the sensitiveness of each power directional relay 15 may be readily adjusted so that it may operate to effect the opening of its contacts 19 and the closing of its contacts 20 in response to different values of reverse power, in accordance with my invention, each relay 15 has associated therewith an adjustable impedance, shown as an adjustable resistor 23, which is arranged to be connected to the winding 17 so that when the associated circuit breaker 5 is closed the winding 17 and the adjustable resistor 23 are connected in series across the power transformer secondary winding. As shown in the drawings, each circuit breaker 5 is provided with auxiliary contacts 24, which are closed when the circuit breaker is closed. The contacts 24, when closed, connect the associated resistor 23 so that the resistors 22 and 23 are connected in series across the secondary of the transformer 4. The contacts 24, when closed, also connect the secondary winding of the current transformer 18, the main contacts of switch 5, and the resistor 23 in a second series circuit across the secondary of the transformer 4. The contacts 24, when closed, also connect and the main contacts of switch 5, the resistor 23 and the current winding 17 in a third series circuit across the secondary winding of the transformer 4. With the connections shown, each current winding 17 therefore is so connected, when the associated circuit breaker 5 is closed, that it is simultaneously connected in series relation and in shunt with the secondary winding of the transformer 4. Each winding 17, therefore, is simultaneously energized in response to the current flowing through the associated circuit breaker 5 and in response to the secondary voltage of the associated transformer 4.

By adjusting the variable impedance 23, the amount of current through the winding 17 due to the voltage of the circuit can be varied and in this manner I am able to provide a very simple means for readily varying the value of reverse power required to cause the relay 15 to open its contacts 19 and close its contacts 20.

By providing the auxiliary contacts 24 in the circuit of each resistor 23, the modifying effect produced by the voltage of the circuit controls only the opening operation of the relay.

The operation of the arrangement shown is as follows: When the circuit breakers 5 and 6 in a feeder are closed and a fault occurs on the feeder, the abnormal current flowing from the supply circuit through the circuit breaker 6 in the faulty feeder to the fault causes the overload trip coil 9 of the circuit breaker 6 to effect the opening thereof.

The reverse current which is fed from the network 1 through the circuit breaker 5 in the faulty feeder to the fault, and which also flows through the primary winding of the current transformer 18 in the faulty feeder causes the current through the current winding 17 of the relay 15 to reverse relative to the current in the relay winding 16 so that a torque is produced by the relay windings 16 and 17 in the proper direction to effect the opening of the relay contacts 19 and the closing of the relay contacts 20. The amount of reverse current required to effect this operation will depend upon the amount of the adjustable resistor 23 connected in circuit.

When the power directional relay 15 closes its contacts 20, it connects the trip coil 12 and the auxiliary contacts 25 on the circuit breaker 5 in the faulty feeder in series across the secondary of the associated power transformer 4 so that the circuit breaker 5 is opened to disconnect the faulty feeder from the network.

After the circuit breaker 6 opens the associated relay 15 maintains its contacts 19 open until the circuit breaker 6 is closed and a predetermined phase relation exists between the voltages of the secondary of the reenergized transformer 4 and the network so that current of the proper phase flows through the current winding 17 and the resistor 22. When the relay 15 closes its contacts 19, it connects the closing coil 11 and auxiliary contacts 26 on the associated circuit breaker 5 in series across the secondary of the associated transformer 4 so that circuit breaker 5 closes and reconnects the feeder to the network.

The modification shown in Fig. 2 is similar to the control arrangement shown in Fig. 1 for each feeder except that I have shown an arrangement for a double pole secondary circuit breaker 5. In this modification the power directional relay 15 is provided with two current coils 17a and 17b which are respectively connected across the secondary windings of two current transformers 18a and 18b, the primary windings of which are connected in different conductors of the secondary circuit of the power transformer 4. The current winding 17a and resistor 22a are permanently connected in series across the stationary contacts of one of the poles of the circuit breaker 5 and the current winding 17b and resistor 22b are permanently connected in series across the stationary contacts of the other pole of the circuit breaker 5 so that the windings are respectively energized in response to the voltage differences across the stationary terminals of two poles of the circuit breaker when it is open.

In order that the reverse power setting of relay 15 may be readily adjusted, the windings 17a and 17b and an adjustable impedance 23 shown as a resistor are arranged to be connected across the secondary of the power transformer 4 by means of the auxiliary contacts 24 on the circuit breaker 5 when it is closed. Both of the windings 17a and 17b are, therefore, energized in response to the voltage of the feeder and the current therein when the associated circuit breaker 5 is closed.

Since the modification shown in Fig. 2 is similar to the arrangement shown in Fig. 1 and the operation is also similar, it is believed that a detailed description of the operation is unnecessary.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desires to secure by Letters Patent of the United States, is:

1. In combination, an alternating current supply circuit, an alternating current network, a power transformer having its primary connected to said circuit and its secondary winding connected to said network, a circuit breaker between said transformer secondary winding and said network, a current transformer having its primary connected in series relation with said power transformer secondary winding and said network, a power directional relay for controlling the operation of said circuit breaker including a current winding simultaneously connected across the secondary winding of said current transformer and across the terminals of said circuit breaker, an impedance, and means controlled by said circuit breaker for connecting said impedance and said current winding in series across the power transformer secondary winding when said circuit breaker is closed.

2. In combination, an alternating current supply circuit, an alternating current network, a power transformer having its primary connected to said circuit and its secondary winding connected to said network, a circuit breaker between said transformer secondary winding and said network, a current transformer having its primary connected in series relation with said power transformer secondary winding and said network, an impedance, a power directional relay for controlling the opening and closing of said circuit breaker incuding a potential winding permanently connected across said network and a current winding permanently connected across the secondary winding of said current transformer and in series with said impedance across the terminals of said circuit breaker, a variable resistor, and means controlled by said circuit breaker for connecting said adjustable resistor to the connection between said current winding and impedance so that when said circuit breaker is closed said current winding and said adjustable resistor are connected in series across said network and said adjustable resistor and said impedance are connected in series across the secondary winding of said power transformer.

In witness whereof, I have hereunto set my hand this 9th day of September, 1929.

DAVID K. BLAKE.